United States Patent
Goyal

(10) Patent No.: US 8,082,270 B2
(45) Date of Patent: Dec. 20, 2011

(54) FUZZY SEARCH USING PROGRESSIVE RELAXATION OF SEARCH TERMS

(75) Inventor: Ram Dayal Goyal, Bangalore (IN)

(73) Assignee: Ketera Software India Pvt. Ltd., Bangalore (IN)

(*) Notice: Subject to any disclaimer, the term of this patent is extended or adjusted under 35 U.S.C. 154(b) by 449 days.

(21) Appl. No.: 12/410,465

(22) Filed: Mar. 25, 2009

(65) Prior Publication Data
US 2010/0125596 A1    May 20, 2010

(51) Int. Cl.
*G06F 17/30* (2006.01)
(52) U.S. Cl. .......... 707/780; 707/713; 707/748
(58) Field of Classification Search .......... 707/713, 707/478, 780
See application file for complete search history.

(56) References Cited

U.S. PATENT DOCUMENTS

| | | | |
|---|---|---|---|
| 5,606,690 A | 2/1997 | Hunter et al. | |
| 6,321,224 B1 | 11/2001 | Beall et al. | |
| 7,206,778 B2 | 4/2007 | Bode et al. | |
| 2003/0177111 A1* | 9/2003 | Egendorf et al. | 707/3 |
| 2007/0239752 A1 | 10/2007 | Beitman | |

OTHER PUBLICATIONS

Gazzotti et al., Database and Expert Systems Applications, Lecture Notes in Computer Science, 1995, vol. 978/1995, pp. 385-394.*

* cited by examiner

*Primary Examiner* — Cheyne Ly
(74) *Attorney, Agent, or Firm* — Ash Tankha; Lipton, Weinberger & Husick

(57) ABSTRACT

Disclosed herein is a computer implemented method and system that progressively relaxes search terms provided by a user. Data of predefined types is stored in a database. The data is obtained by uniquely modifying data previously stored in the database, based on the predefined types. Search terms of predefined types are accepted from the user. The search terms are compared with the stored data to find exact matches, if length of the search terms exceeds a predefined value. On not finding exact matches, the accepted search terms are modified uniquely based on the predefined types to structure first alternative queries. The first alternative queries are compared with the stored data to find exact matches. On not finding exact matches, the first alternative queries are modified based on the predefined types to structure second alternative queries. The second alternative queries are compared with the stored data to find approximate matches.

8 Claims, 6 Drawing Sheets

```
FormFuzzyNameQuery(Vector of tokens of ProcessedName)
{
        If only one token then
                if it is of length > 6 then return !token
                else return token;
        If there are only two tokens then
                Return "Fuzzy (token1, 60, 30, w); Fuzzy (token2
60, 30, w)";

From third token onwards
                if token length is just one ignore that. For the
        remaining do
        Return "Fuzzy (token1, 60, 30, w) & (Fuzzy (token2, 60,
30, w), Fuzzy(token3, 60, 30, w), Fuzzy(token4, 60, 30, w))"
}
```

FIG. 4

```
MatchingScore(String Name1, Sound1, String Name2, Sound2)
{
        //capture spelling mistake due to pronunciation
        If (soundLen > 4) and (Sound1 == Sound2) return
SoundLen/NameLen;
        //capture important part
        PrefixScore(number of initial chars matching/max len);
        //capture typo
        LDScore(1 – 2*LD/MinLen);
        //capture order insensitivity
        TokenScore(fraction of number of token matching);
        Return Max (PrefixScore, LDScore, TokenScore);
}
```

FIG. 6

FUZZY SEARCH USING PROGRESSIVE RELAXATION OF SEARCH TERMS

CROSS REFERENCE TO RELATED APPLICATIONS

This application claims the benefit of the non-provisional patent application number 2799/CHE/2008 titled "Fuzzy Search Using Progressive Relaxation Of Search Terms", filed on Nov. 14, 2008 in the Indian Patent Office.

BACKGROUND

This invention, in general, relates to text searching. More specifically, this invention relates to progressive relaxation of search terms provided by a user for finding matches of the search terms in a database.

Databases may contain large numbers of data records. Sometimes databases may contain millions of data records, each comprising multiple text fields, for example, name, street address, city, state, country, and zip. While searching the databases, the most relevant records for search terms in any given combination of the text fields should be found, for example, name and city only, name, street address, and zip, name, country, and zip, etc.

For example, if the search terms comprise name, street address, city, state, and zip data types, this task is typically done using the following approach: First, the database is searched to find records where all the fields match. If desired results are not found, then the database is searched for matches of name, street address, city, and state only. In the next iteration, name, street address, and city are searched, followed by name and street address, and finally, name only.

The approach described above is straight forward and does not take into account possible spelling errors by the user. Moreover, the approach described above only relaxes the constraints and does not consider different combinations of the fields or types of the search terms. Commercially available database management systems typically provide functions to perform these tasks; however the results returned require manual verification for finding accurate matches, which may be a cumbersome task, especially while searching multiple queries in batch mode.

Hence, there is a need for a computer implemented method and system that performs a fuzzy search by progressively relaxing search terms provided by a user while considering different combinations of the data fields and types of the search terms and eliminating the need for manual verification.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for performing a fuzzy search by progressively relaxing search terms provided by a user while considering different combinations of the data fields and types of the search terms and eliminating the need for manual verification. Data of predefined types is stored into multiple first data fields of a multicolumn table in a database. The data is obtained by modifying data previously stored in multiple second data fields in the database. The modifications are uniquely performed based on the predefined types of the previously stored data. The predefined types of the data are, for example, name, street address, city, state, zip, and country. The modifications comprise, for example, concatenation and compensating for spelling errors, typographical errors, punctuation errors, phonological ambiguity, non standard querying, etc.

Multiple search terms of predefined types are accepted from a user for searching in the first data fields of the multicolumn table in the database. Length of the accepted search terms is computed. If length of an accepted search term is greater than a predefined value, the accepted search terms are compared with the stored data in the first data fields to find exact matches. If the exact matches are not found, each of the accepted search terms is modified uniquely based on the predefined types of the accepted search terms to structure first alternative queries.

The structured first alternative queries are compared with the data in the first data fields of the multicolumn table in the database to find exact matches. The exact matches may be ranked based on accuracy of the found matches. If the exact matches are not found, the first alternative queries are modified to structure second alternative queries. Each of the first alternative queries is modified uniquely based on the predefined types of the first alternative queries. The structured second alternative queries are compared with the stored data in the first data fields to find approximate matches. The found approximate matches may be ranked based on accuracy of the found matches. A matching score may be computed for ranking the exact matches and the found approximate matches.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 4 exemplarily illustrates a pseudocode segment for structuring alternative queries for search terms of type name.

FIG. 6 exemplarily illustrates a code segment for computing matching score for ranking the found matches.

DETAILED DESCRIPTION OF THE INVENTION

Figure 1:
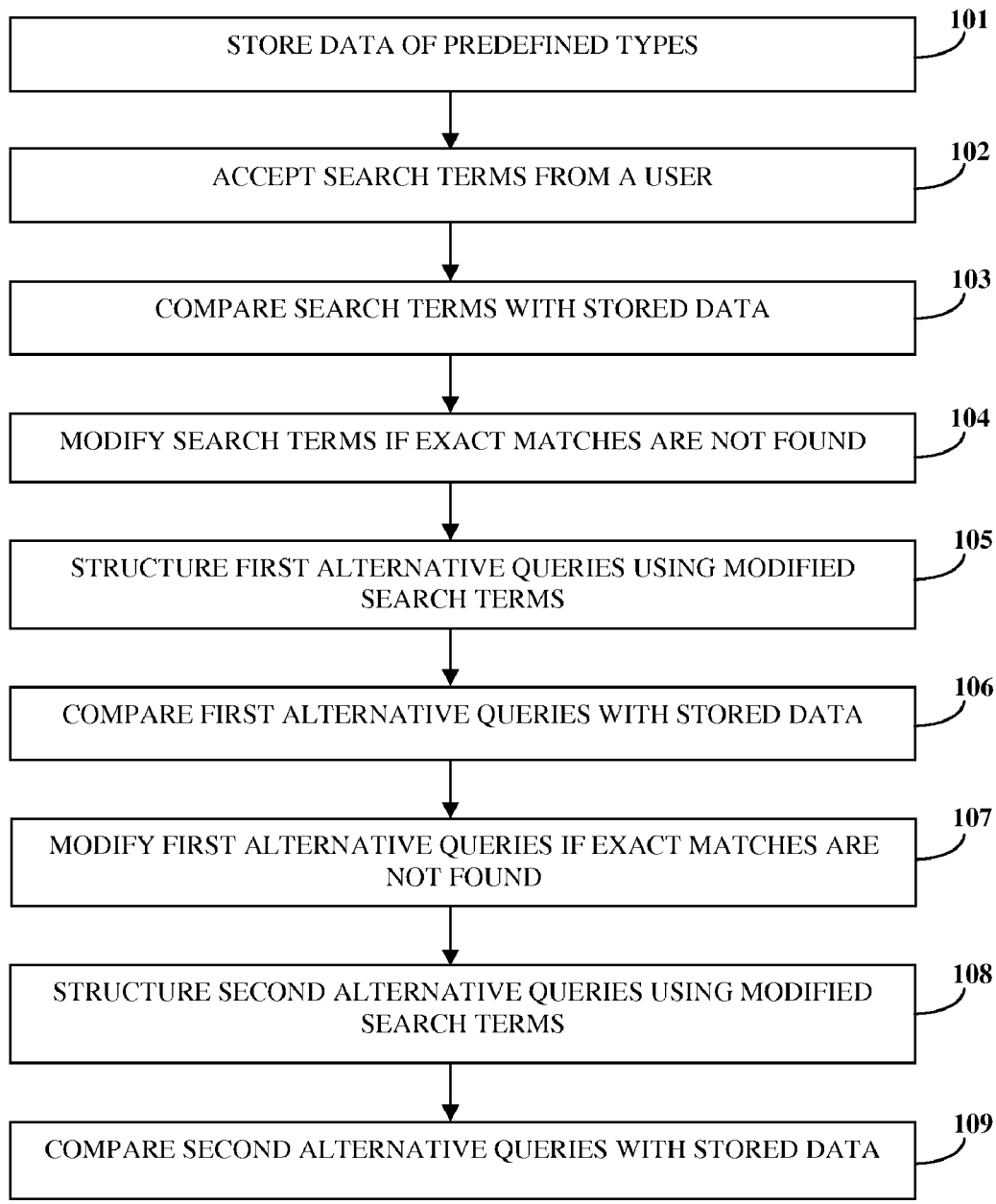
FIG. 1 illustrates a computer implemented method of progressively relaxing search terms provided by a user for finding matches of the search terms in a database.

FIG. 1 illustrates a computer implemented method of progressively relaxing search terms provided by a user 208. Data of predefined types is stored 101 into multiple first data fields of a multicolumn table in a database 209. The data is obtained by modifying data previously stored in multiple second data fields in the database 209. The modifications are uniquely performed based on the predefined types of the previously stored data. The predefined types of the data are, for example, name, street address, city, state, zip, and country. The modifications to the previously stored data comprise, for example, concatenation and compensating for spelling errors, typographical errors, punctuation errors, phonological ambiguity, non standard querying, etc. For example, previously stored data "Los Angeles" of type city may be concatenated and stored as "losangeles". Context indexes may be created for the data in the first data fields. For example, a bitmap index may be created for data whose predefined type is state.

Multiple search terms of predefined types are accepted 102 from a user 208 for searching in the first data fields of the multicolumn table in the database 209. Length of the accepted search terms is computed. If the length of the accepted search terms is greater than a predefined value, the accepted search terms are compared 103 with the stored data in the first data fields to find exact matches. For example, if the length of the accepted search terms of type name is greater than 15, the accepted search terms of type name are compared with the stored data in the first data fields to find exact matches. If the exact matches are not found, each of the accepted search terms is modified 104 uniquely based on the predefined types of the accepted search terms to structure first alternative queries. The modifications to the accepted search terms comprise, for example, concatenation and compensating for spelling errors, typographical errors, punctuation errors, phonological ambiguity, non standard querying, etc.

If the predefined type of the accepted search term is, for example, name, occupancy apostrophe may be removed from the accepted search term. Stop words may also be removed and their expanded forms may be found. Stop words are frequently occurring insignificant words that appear in the database 209, for example, "inc", "ltd", etc. The expanded forms of the stop words may be "incorporated", "limited", etc. The stop words may be stored separately with their expanded forms. Plural words may be converted to their singular forms. The name may be concatenated and phonetic equivalents of the concatenated name may be found. However, if the predefined type of the accepted search term is city, the modification may comprise only removing spaces and hyphens from the accepted search term, and concatenating the modified search term. For example, "San Jose" may be modified to "sanjose".

Similarly, for a search term of type street address, occupancy apostrophe, stop words, and punctuation symbols may be removed. For example, "St. John's" may be modified to "St John". For a search term of type zip, spaces and hyphens may be removed, and the resulting zip may be concatenated. For example, "123 678" may be modified to "123678". Similarly, for a search term of type state, spaces and hyphens may be removed, and the resulting state may be concatenated. For example, "New York" may be modified to "newyork".

Consider an example of a search term "Ketera Pvt Ltd" of type name. After removing the stop words "Pvt" and "Ltd", the name is modified to "ketera". The stop words may be stored as "pvt" and "ltd". After concatenation, the name "ketera" is obtained. The phonetic equivalent of the name, "ktr", is found. The expanded forms of the stop words "pvt" and "ltd" are found to be "private" and "limited".

Multiple first alternative queries are structured 105 using the modified search terms. The structured first alternative queries are compared 106 with the data in the first data fields of the multicolumn table in the database 209 to find exact matches. If the exact matches are not found, the first alternative queries are modified 107 to structure 108 second alternative queries. Each of the first alternative queries is modified uniquely based on the predefined types of the first alternative queries. The structured second alternative queries are compared 109 with the stored data in the first data fields to find approximate matches. The found approximate matches and the found exact matches may be ranked based on a matching score. The matching score may be computed based on accuracy of the found approximate matches and the found exact matches. A code segment for computing the matching score for ranking the found approximate matches is exemplarily illustrated in FIG. 6.

If a first alternative query of type name has length greater than a predefined value, only exact matches may be found. If the number of found exact matches is greater than one, then the found exact match comprising maximum number of matching stop words is ranked highest. For example, if a first alternative query is "johnsmith", and the predefined value is 8, then only exact matches for "johnsmith" will be found. If the accepted search term is "John T Smith", and "T" is a removed stop word, the found exact matches comprising "T" as stop words will be ranked highest among the found exact matches.

The ranked found matches may be returned to the user 208. Only the ranked found matches with a matching score greater than a threshold value may be returned to the user 208. For example, only the ranked found matches with a matching score of 50 or greater may be returned to the user 208. The threshold value may be computed based on the predefined types of the found matches and number of words in the accepted search terms. For example, if a search term of type name has only one word, the threshold value may be 0. If a search term of type name has only two words, the threshold value may be 50. For three words, the threshold value may be 60. Similarly, for street address, if a search term of type street address has only one word, the threshold value may be 0. If a search term of type street address has only two words, the threshold value may be 50. For three words, the threshold value may be 60.

Figure 2:
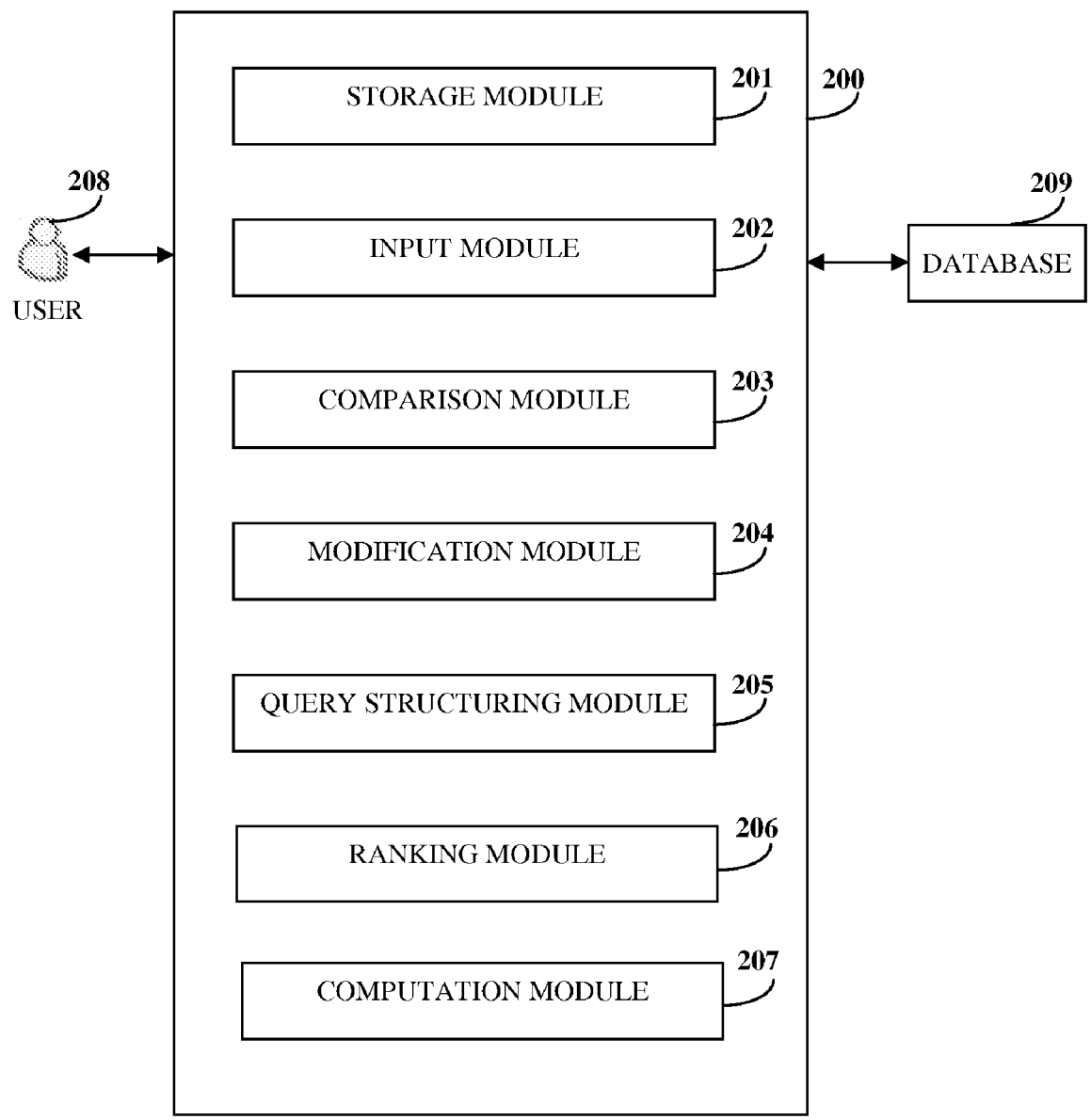
FIG. 2 illustrates a computer implemented system for progressively relaxing search terms provided by a user for finding matches of the search terms in a database.

FIG. 2 illustrates a computer implemented system for progressively relaxing search terms provided by a user 208. The system 200 disclosed herein comprises a storage module 201, an input module 202, a comparison module 203, a modification module 204, a query structuring module 205, a ranking module 206, and a computation module 207.

The modification module 204 modifies data previously stored in multiple second data fields in the database 209. The modification module 204 uniquely modifies the previously stored data based on the predefined types of the previously stored data. The predefined types of the data are, for example, name, street address, city, state, zip, and country. The modifications made to the previously stored data comprise, for example, concatenation and compensating for spelling errors, typographical errors, punctuation errors, phonological ambiguity, and non standard querying. The storage module 201 stores the modified data of predefined types into multiple first data fields of the multicolumn table in the database 209.

The input module 202 accepts multiple search terms of the predefined types from a user 208. The computation module 207 computes length of the search terms. If the length of the accepted search terms is greater than a predefined value, the comparison module 203 compares the search terms accepted by the input module 202 with the stored data to find exact matches. If the exact matches are not found, the modification module 204 modifies the accepted search terms. Each of the accepted search terms is modified uniquely based on the predefined types of the accepted search terms. The modifications comprise, for example, concatenation and compensating for spelling errors, typographical errors, punctuation errors, phonological ambiguity, and non standard querying.

For example, if the predefined type of the accepted search term is name, the modification module 204 may remove occupancy apostrophe from the accepted search term. The modification module 204 may remove stop words and find their expanded forms. The modification module 204 may convert plural words to their singular forms. The modification module 204 may concatenate the name and find phonetic equivalents of the concatenated. However, if the predefined type of the accepted search term is city, the modification module 204 may only remove spaces and hyphens from the search term, and concatenate the modified search term. Similarly, the modification module 204 may modify a search term whose predefined type is one of street address, state, zip, and country uniquely based on the predefined type of the search term.

The query structuring module 205 structures multiple first alternative queries using the modified search terms. The comparison module 203 compares the structured first alternative queries with the data in the first data fields of the multicolumn table in the database 209 to find exact matches. The modification module 204 modifies the first alternative queries to structure second alternative queries if the matches are not found. The modification module 204 modifies each of the first alternative queries uniquely based on the predefined types of the first alternative queries. The query structuring module 205 structures multiple second alternative queries using the modified first alternative queries. The comparison module 203 compares the structured second alternative queries with the data in the first data fields of the multicolumn table in the database 209 to find approximate matches.

The ranking module 206 ranks the found approximate matches and the found exact matches based on accuracy of the found approximate matches and the found exact matches. A matching score may be computed for ranking the found approximate matches and the found exact matches. If the number of found exact matches is greater than one, the ranking module 206 ranks the found exact match comprising maximum number of matching stop words highest.

Figure 3:
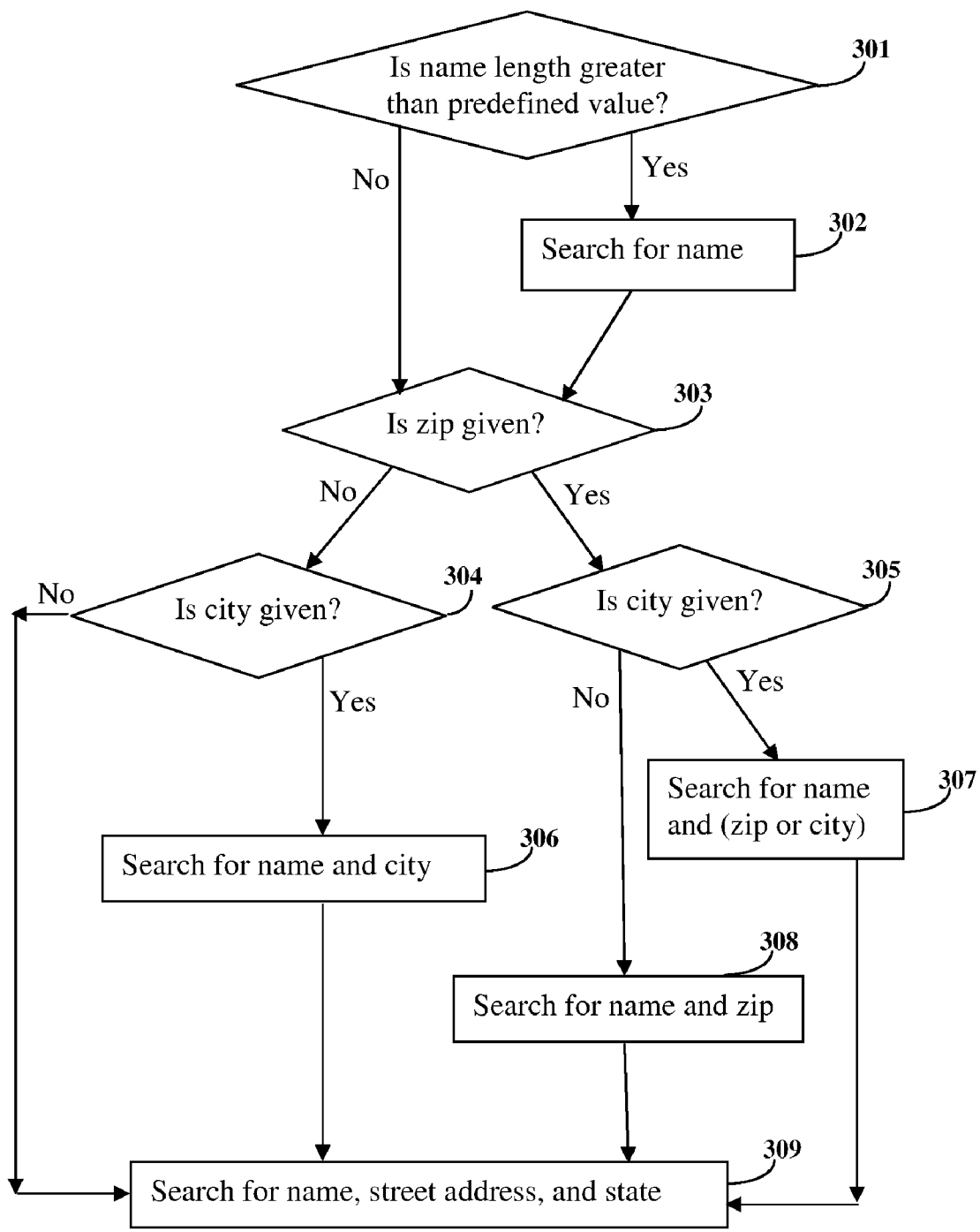
FIG. 3 exemplarily illustrates a flowchart for performing a name search by progressively relaxing search terms provided by a user.

FIG. 3 exemplarily illustrates a flowchart for performing a name search by progressively relaxing search terms provided by a user 208. An exact name search may be performed when a modified search term whose predefined type is name has length greater than a predefined value after concatenation. The system 200 disclosed herein checks the length of the search term whose predefined type is name. If name length is greater 301 than a predefined value, for example 15, the system 200 searches 302 for matches of the name in the first data fields of the multicolumn table in the database 209. The search process is completed if matches are found for name. If the matches are not found for name, the system 200 checks for zip in the accepted search terms. Further, if name length is not greater 301 than the predefined value, the system 200 checks for zip in the accepted search terms. If zip is given 303, the system 200 checks for city. If city is given 305, the system 200 searches 307 for a combination of name and one of zip and city in the first data fields in the database 209. The search process is completed if matches are found for the combination of name and one of zip and city. If the matches are not found for the combination of name and one of zip and city, the system 200 searches 309 for a combination of name, street address, and state. If city is not given 305, the system 200 searches 308 for a combination of name and zip in the first data fields in the database 209. The search process is completed if matches are found for name and zip. If the matches are not found for name and zip, the system 200 searches 309 for a combination of name, street address, and state.

If zip is not given 303, the system 200 checks for city. If city is given 304, the system 200 searches 306 for a combination of name and city in the first data fields in the database 209. The search process is completed if matches are found for name and city. If the matches are not found for name and city, the system 200 searches 309 for a combination of name, street address, and state. If city is not given 304, the system 200 directly searches 309 for a combination of name, street address, and state. If multiple matches are found, matches comprising at least one matching stop word are ranked higher than matches not comprising any matching stop words. A pseudocode segment for structuring alternative queries for search terms of type name is exemplarily illustrated in FIG. 4.

Figure 5:
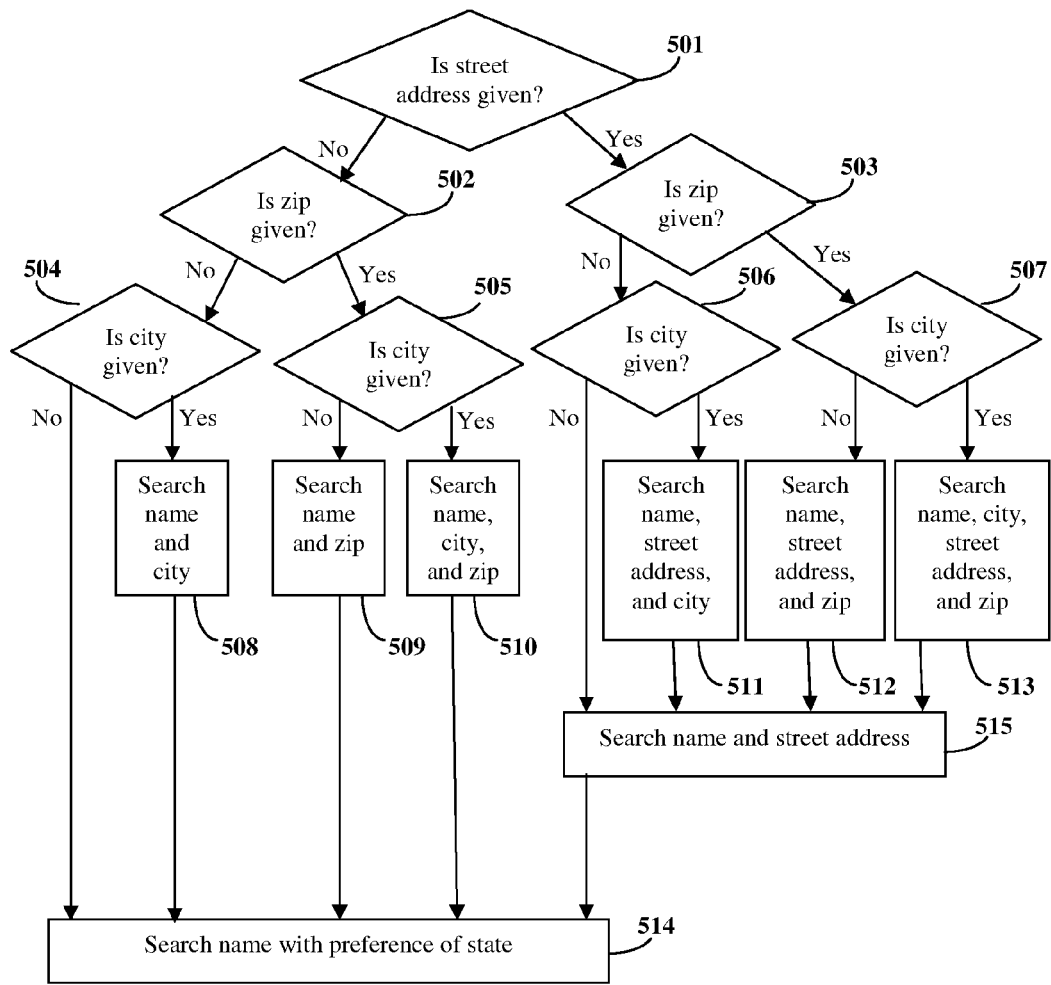
FIG. 5 exemplarily illustrates a flowchart for performing a fuzzy name search by progressively relaxing search terms provided by a user.

FIG. 5 exemplarily illustrates a flowchart for performing a fuzzy name search by progressively relaxing search terms provided by a user 208. The system 200 checks for street address in the accepted search terms. If street address is given 501, the system 200 checks for zip. If zip is given 503, the system 200 checks for city. If city is also given 507, the system 200 searches 513 for name, city, street address, and zip. The search process is completed if matches are found for name, city, street address, and zip. If the matches are not found for name, city, street address, and zip, the system 200 searches 515 for name and street address. The search process is completed if matches are found for name and street address. If the matches for name and street address are not found, the system 200 searches 514 for only name, with an indicated preference of state. If city is not given 507, the system 200 searches 512 for name, street address, and zip. The search process is completed if matches are found for name, street address, and zip. If the matches for name, street address, and zip are not found, the system 200 searches 515 for name and street address. The search process is completed if matches are found for name and street address. If the matches are not found for name and street address, the system 200 searches 514 for only name, with an indicated preference of state.

If zip is not given 503, the system 200 checks for city. If city is given 506, the system 200 searches 511 for name, street address, and city. The search process is completed if matches are found for name, street address, and city. If the matches are not found for name, street address, and city, the system 200 searches 515 for a combination of name and street address. The search process is completed if matches are found name and street address. If the matches are not found name and street address, the system 200 searches 514 for only name, with an indicated preference of state. If city is not given 506, the system 200 the system 200 searches 515 for name and street address. The search process is completed if matches are found for name and street address. If the matches for name and street address are not found, the system 200 searches 514 for only name, with an indicated preference of state.

If street address is not given 501, the system 200 checks for zip. If zip is given 502, the system 200 checks for city. If city is given 505, the system 200 searches 510 for a combination of name, city, and zip. The search process is completed if matches are found for name, city, and zip. If the matches are not found for name, city, and zip, the system 200 searches 514 for only name, with an indicated preference of state. If city is not given 505, the system 200 searches 509 for a combination of name and zip. The search process is completed if matches are found for name and zip. If the matches are not found for name and zip, the system 200 searches 514 for only name, with an indicated preference of state. If zip is not given 502, the system 200 checks for city. If city is given 504, the system 200 searches 508 for name and city. The search process is completed if matches are found for name and city. If the matches are not found for name and city, the system 200 searches 514 for only name, with an indicated preference of state. If city is not given 504, the system 200 directly searches 514 for only name with an indicated preference of state.

Matching scores may be computed for the first predefined number of found matches. The matching scores may be computed, for example, for the first 50 found matches. The found matches may be ranked based on the computed matching scores. If the matching scores of any two found matches differ by not more than a predefined value, for example 0.1, matches comprising at least one matching stop word are ranked higher than matches not comprising any matching stop words.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the database 209, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method of progressively relaxing search terms provided by a user for finding matches of said search terms in a database, comprising the steps of:

storing data of predefined types into a plurality of first data fields of a multicolumn table in said database, wherein said data is obtained by uniquely modifying data previously stored in a plurality of second data fields in the database, wherein said previously stored data is modified based on said predefined types of the previously stored data, wherein the predefined types comprise name, street address, city, state, zip, and country;

accepting a plurality of the search terms of the predefined types from said user, wherein length of said accepted search terms is computed;

comparing the accepted search terms with said stored data in said first data fields to find exact matches, if said length of the accepted search terms is greater than a predefined value;

modifying the accepted search terms to structure first alternative queries if said exact matches are not found, wherein each of the accepted search terms is modified uniquely based on the predefined types of the accepted search terms;

comparing said structured first alternative queries with the stored data in the first data fields to find exact matches;

modifying the first alternative queries to structure second alternative queries if said exact matches are not found, wherein each of the first alternative queries is modified uniquely based on the predefined types of the first alternative queries, and wherein said steps of modifying the accepted search terms and modifying the first alternative queries comprise concatenating and compensating for spelling errors, typographical errors, punctuation errors, phonological ambiguity, and non standard querying; and comparing by the comparison module said structured second alternative queries with the stored data in the first data fields to find approximate matches;

whereby said modification of the search terms and the first alternative queries to structure the first alternative queries and the second alternative queries respectively enables progressive relaxation of the search terms for finding matches of the search terms in the database.

2. The computer implemented method of claim 1, further comprising a step of ranking said found matches based on accuracy of the found matches.

3. The computer implemented method of claim 2, wherein said step of ranking the found matches is performed based on a matching score, wherein said matching score is computed based on accuracy of the found matches.

4. A computer implemented system for progressively relaxing search terms provided by a user for finding matches of said search terms in a database, comprising:
   a processor;
   a storage module storing data of predefined types into a plurality of first data fields of a multicolumn table in said database, wherein said data is obtained by uniquely modifying data previously stored in a plurality of second data fields in the database, wherein said previously stored data is modified based on said predefined types of the previously stored data, wherein the predefined types comprise name, street address, city, state, zip, and country;
   an input module accepting a plurality of the search terms of the predefined types from said user, wherein length of said accepted search terms is computed;
   a comparison module comparing the accepted search terms with said stored data in said first data fields to find exact matches, if said length of the accepted search terms is greater than a predefined value;
   a modification module modifying the accepted search terms to structure first alternative queries if said exact matches are not found, wherein each of the accepted search terms is modified uniquely based on the predefined types of the accepted search terms;
   comparing by the comparison module said structured first alternative queries with the stored data in the first data fields to find exact matches;
   modifying by the modification module the first alternative queries to structure second alternative queries if said exact matches are not found, wherein each of the first alternative queries is modified uniquely based on the predefined types of the first alternative queries, and wherein said steps of modifying the accepted search terms and modifying the first alternative queries comprise concatenating and compensating for spelling errors, typographical errors, punctuation errors, phonological ambiguity, and non standard querying;
   comparing by the comparison module said structured second alternative queries with the stored data in the first data fields to find approximate matches;
   whereby said modification of the search terms and the first alternative queries to structure the first alternative queries and the second alternative queries respectively enables progressive relaxation of the search terms for finding matches of the search terms in the database.

5. The computer implemented system of claim 4, further comprising a ranking module for ranking said found matches based on accuracy of the found matches.

6. The computer implemented system of claim 4, further comprising a computation module for computing length of the accepted search terms, wherein said length is compared with a predefined value to determine need for comparing the accepted search terms with the stored data in the first data fields to find exact matches.

7. The computer implemented system of claim 6, wherein said computation module further computes a matching score for each of said found matches.

8. A non-transitory computer readable medium storing instructions for progressively relaxing search terms provided by a user for finding matches of said search terms in a database, wherein the instructions when executed by a processor performing steps of:
   storing data of predefined types into a plurality of first data fields of a multicolumn table in said database, wherein said data is obtained by uniquely modifying data previously stored in a plurality of second data fields in the database, wherein said previously stored data is modified based on said predefined types of the previously stored data, wherein the predefined types comprise name, street address, city, state, zip, and country;
   accepting a plurality of the search terms of the predefined types from said user, wherein length of said accepted search terms is computed;
   comparing the accepted search terms with said stored data in said first data fields to find exact matches, if said length of the accepted search terms is greater than a predefined value;
   modifying the accepted search terms to structure first alternative queries if said exact matches are not found, wherein each of the accepted search terms is modified uniquely based on the predefined types of the accepted search terms;
   comparing said structured first alternative queries with the stored data in the first data fields to find exact matches;
   modifying by the modification module the first alternative queries to structure second alternative queries if said exact matches are not found, wherein each of the first alternative queries is modified uniquely based on the predefined types of the first alternative queries, and wherein said steps of modifying the accepted search terms and modifying the first alternative queries comprise concatenating and compensating for spelling errors, typographical errors, punctuation errors, phonological ambiguity, and non standard querying;
   comparing said structured second alternative queries with the stored data in the first data fields to find approximate matches;
   whereby said modification of the search terms and the first alternative queries to structure the first alternative queries and the second alternative queries respectively enables progressive relaxation of the search terms for finding matches of the search terms in the database.

* * * * *